(12) United States Patent
Markle et al.

(10) Patent No.: US 7,254,453 B2
(45) Date of Patent: Aug. 7, 2007

(54) SECONDARY PROCESS CONTROLLER FOR SUPPLEMENTING A PRIMARY PROCESS CONTROLLER

(75) Inventors: Richard J. Markle, Austin, TX (US); Thomas J. Sonderman, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 424 days.

(21) Appl. No.: 10/301,051

(22) Filed: Nov. 21, 2002

(65) Prior Publication Data

US 2004/0102857 A1    May 27, 2004

(51) Int. Cl.
G05B 13/02    (2006.01)
G06F 19/00    (2006.01)

(52) U.S. Cl. .................... 700/28; 700/95; 700/121

(58) Field of Classification Search .............. 700/3, 700/19, 20, 28–29, 44–45, 51, 95, 117, 121, 700/1; 318/561
See application file for complete search history.

(56) References Cited

U.S. PATENT DOCUMENTS

| | | | | |
|---|---|---|---|---|
| 5,130,631 | A * | 7/1992 | Gordon et al. | 318/568.11 |
| 5,461,559 | A * | 10/1995 | Heyob et al. | 700/29 |
| 5,479,340 | A * | 12/1995 | Fox et al. | 700/33 |
| 5,751,586 | A | 5/1998 | Grabovac | 364/474.11 |
| 5,886,896 | A | 3/1999 | Lantz et al. | 364/468.23 |
| 6,197,604 | B1 * | 3/2001 | Miller et al. | 438/14 |
| 6,249,712 | B1 * | 6/2001 | Boiquaye | 700/31 |
| 6,304,999 | B1 | 10/2001 | Toprac et al. | 716/4 |
| 6,424,880 | B1 * | 7/2002 | Goder et al. | 700/121 |
| 6,456,894 | B1 * | 9/2002 | Nulman | 700/121 |
| 6,535,785 | B2 * | 3/2003 | Johnson et al. | 700/121 |
| 6,587,744 | B1 * | 7/2003 | Stoddard et al. | 700/121 |
| 6,631,299 | B1 * | 10/2003 | Patel et al. | 700/37 |
| 6,756,243 | B2 * | 6/2004 | Pasadyn et al. | 438/14 |

FOREIGN PATENT DOCUMENTS

EP    1 083 470 A2    9/2000
WO    01/75534    10/2001

OTHER PUBLICATIONS

Google definition for METROLOGY.*
International Search Report dated May 19, 2004 for International application No. PCT/US03/35326 Filed Nov. 11, 2003.

* cited by examiner

Primary Examiner—Ronald D Hartman, Jr.
(74) Attorney, Agent, or Firm—Williams, Morgan & Amerson, P.C.

(57) ABSTRACT

A method and an apparatus for implementing a multi-variate process control system. A workpiece is processed using a primary process control function during a first time period. A secondary process control function is performed during at least a portion of the first time period for processing of the workpiece. The secondary process control function is capable of modifying at least one secondary control parameter.

36 Claims, 8 Drawing Sheets

SECONDARY PROCESS CONTROLLER FOR SUPPLEMENTING A PRIMARY PROCESS CONTROLLER

BACKGROUND OF THE INVENTION

1. Field of the Invention

This invention relates generally to semiconductor manufacturing, and, more particularly, to a method and apparatus for employing a secondary process controller in conjunction with a primary process controller.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a typical flow of processes performed on a semiconductor wafer 105 by a semiconductor manufacturing system is illustrated. A manufacturing system may process semiconductor wafers 105 associated with a batch/lot (block 210). Upon processing the semiconductor wafers 105, the manufacturing system may acquire manufacturing data, such as metrology data and/or tool-state data (block 220). The manufacturing system may then analyze the manufacturing data to calculate changes that may be made to the processes performed on the semiconductor wafers 105 (block 230). Based upon the calculated changes, the manufacturing system may perform feedback control that may adjust a primary control parameter associated with processing of the semiconductor wafers 105 (block 240).

Among the problems associated with the current methodology includes the fact that the process control flow described in FIG. 2 generally utilizes a uni-variate process control system that is used to control a primary process control parameter, such as adjusting a recipe on a process. The current methodologies involve making calculations that perform coarse-point adjustments to the process in order to reduce errors in processing semiconductor wafers 105. However, since the uni-variate system employed in today's process systems generally only provide coarse-point adjustments, accuracy of the processing of semiconductor wafers 105 within a desired tolerance level may be difficult to achieve. Often, several uni-variate control adjustment feedback cycles may be required before acceptable semiconductor wafers 105 are processed. This may result in slower reaction to process errors and in greater expense of processing semiconductor wafers 105.

The present invention is directed to overcoming, or at least reducing, the effects of, one or more of the problems set forth above.

SUMMARY OF THE INVENTION

In one aspect of the present invention, a method is provided for implementing a multi-variate process control system. A workpiece is processed using a primary process control function during a first time period. A secondary process control function is performed during at least a portion of the first time period for processing of the workpiece. The secondary process control function is capable of modifying at least one secondary control parameter.

In another aspect of the present invention, a system is provided for implementing a multi-variate process control system. The system includes a processing tool to process a workpiece. The system also includes a primary and a secondary process controller operatively coupled to the processing tool. The primary process controller is adapted to process a workpiece using a primary process control function during a first time period. The secondary process controller is capable of performing a secondary process control function during at least a portion of the first time period for processing of the workpiece. The secondary process control function is capable of modifying at least one secondary control parameter.

In another aspect of the present invention, an apparatus is provided for implementing a multi-variate process control system. The apparatus includes a primary and a secondary process controller. The primary process controller is adapted to process a workpiece using a primary process control function during a first time period. The secondary process controller is capable of performing a secondary process control function during at least a portion of the first time period for processing of the workpiece. The secondary process control function is capable of modifying at least one secondary control parameter.

In yet another aspect of the present invention, a computer readable program storage device encoded with instructions is provided for implementing a multi-variate process control system. The computer readable program storage device encoded with instructions that, when executed by a computer, performs a method, which comprises: processing a workpiece using a primary process control function during a first time period; and performing a secondary process control function during at least a portion of the first time period for processing of the workpiece. The secondary process control function is capable of modifying at least one secondary control parameter.

BRIEF DESCRIPTION OF THE DRAWINGS

The invention may be understood by reference to the following description taken in conjunction with the accompanying drawings, in which like reference numerals identify like elements, and in which.

Figure 1:
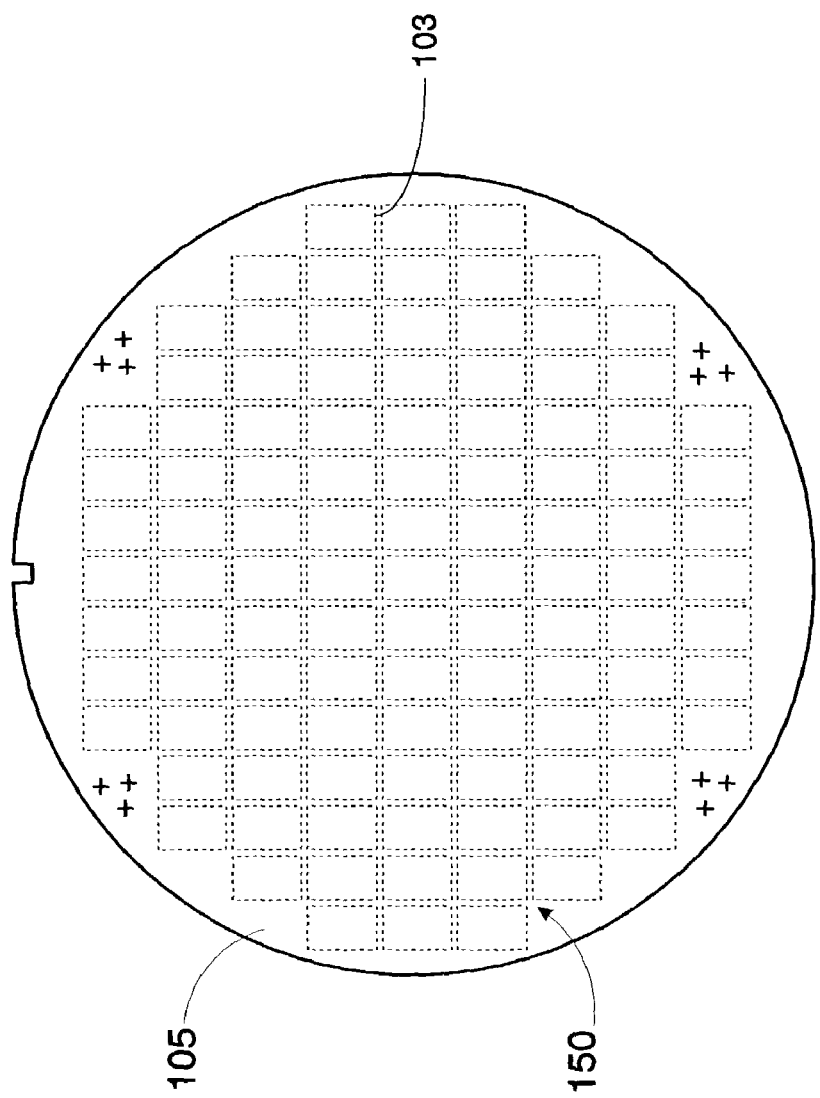
FIG. 1 is a simplified diagram of a prior art semiconductor wafer being processed.
Figure 2:
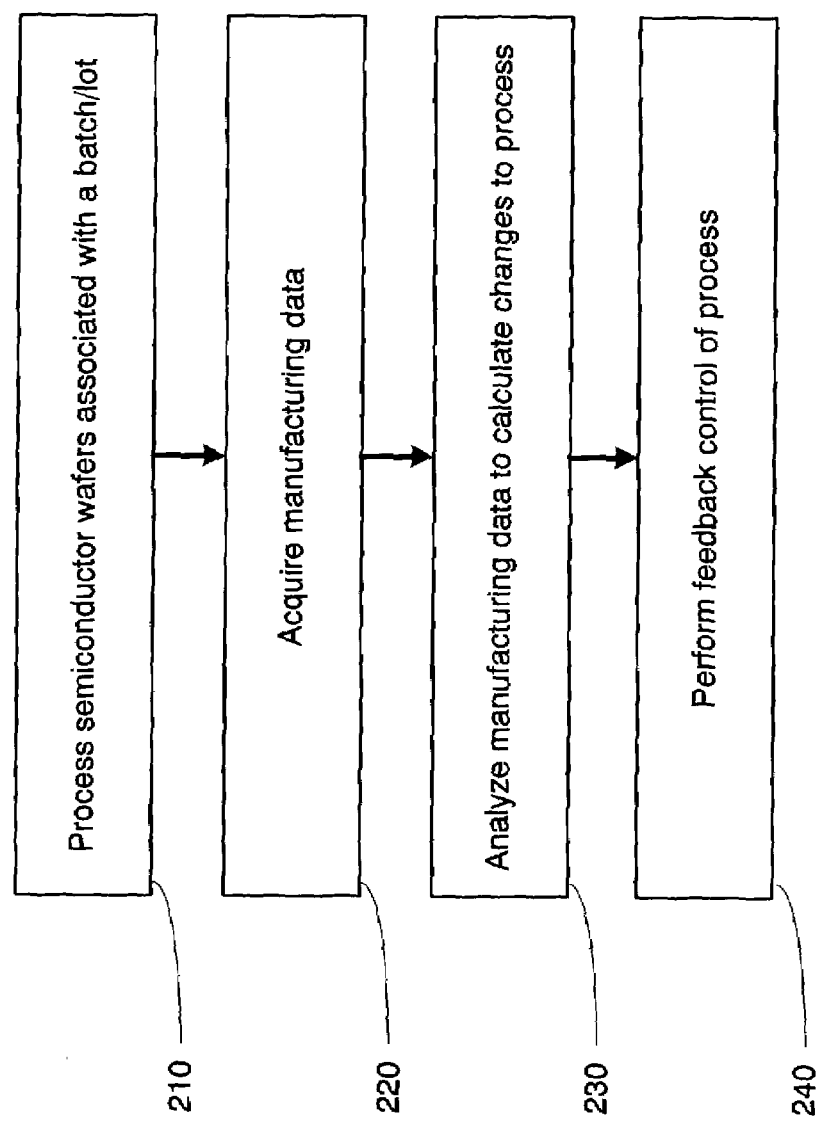
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes involved in semiconductor manufacturing. Many times, workpieces (e.g., semiconductor wafers 105, semiconductor devices, etc.) are stepped through multiple manufacturing process tools. Embodiments of the present invention provide for employing a plurality of process control schemes to generate an efficient multi-variate process control feedback and/or feed-forward control system. Embodiments of the present invention may be utilized to provide a primary process control that may be supplemented with a nested secondary process control. Therefore, coarse-point adjustments, as well as fine-point adjustments, may be made to better control the accuracy of the processes performed on semiconductor wafers 105. A fault detection and classification system may be utilized to perform primary corrective feedback/feed-forward corrections, while a nested secondary control system may react more quickly using lower threshold limitations in order to provide multi-variate, fine-tuned adjustments to a plurality of variables associated with the processing of semiconductor wafers 105. Furthermore, the rate of change permitted by the primary process control may be different from the rate at which more fined-tuned, multi-variate secondary control systems are implemented. Utilizing embodiments of the present invention, coarse-point and fine-point tuning of processes performed on semiconductor wafers 105 may be achieved, thereby resulting in more accurately processed semiconductor wafers 105.

Figure 3:
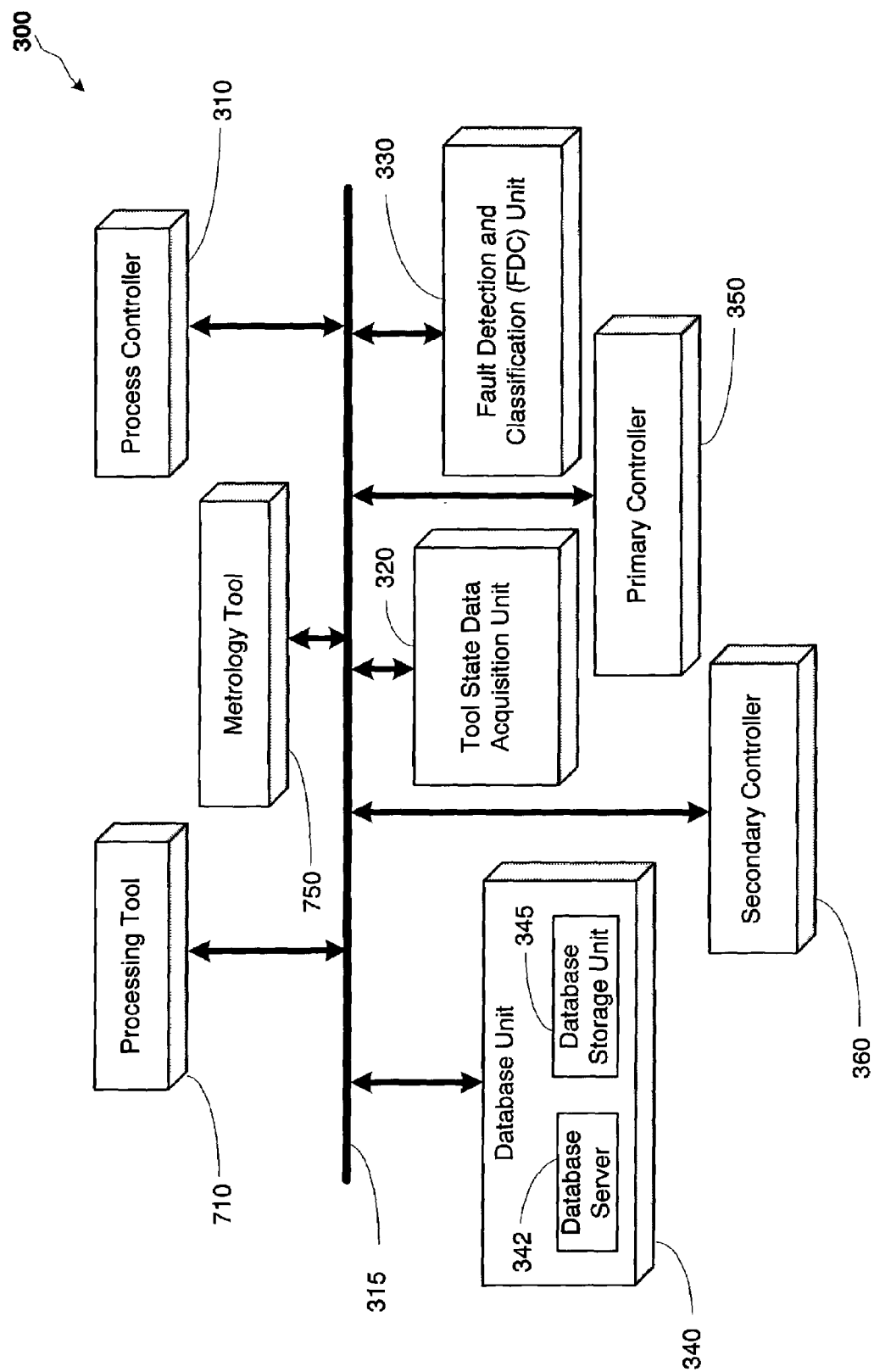
FIG. 3 provides a block diagram representation of a system in accordance with one illustrative embodiment of the present invention.

Turning now to FIG. 3, a block diagram depiction of a system 300 in accordance with embodiments of the present invention is illustrated. A process controller 310 in the system 300 is capable of controlling various operations relating to a processing tool 710. The system 300 is capable of acquiring manufacturing related data, such as metrology data related to processed semiconductor wafers 105, tool-state data, and the like. The system 300 may comprise a metrology tool 750 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., metrology data, process state data, the status of the processing tool 710, the status of semiconductor wafers 105, etc.). The database unit 340 may store tool-state data, such as tool-state data relating to a plurality of process runs performed by the processing tool 710. The database unit 340 may comprise a database server 342 for storing tool-state data and/or other manufacturing data related to processing semiconductor wafers 105 into a database storage unit 345.

The system 300 may also comprise a tool-state data acquisition unit 320 for acquiring tool-state data. The tool-state data may include pressure data, temperature data, humidity data, gas flow data, various electrical data, and the like, related to operations of the processing tool 710. Exemplary tool-state data for an etch tool may include gas flow, chamber pressure, chamber temperature, voltage, reflected power, backside helium pressure, RF tuning parameters, etc., that are traced and/or recoded throughout a period of time. Tool-state data may also include data external to the processing tool 710, such as ambient temperature, humidity, pressure, etc. A more detailed illustration of the tool-state data acquisition unit 320 is provided in FIG. 4 and accompanying description below.

The system 300 also comprises a fault detection and classification unit (FDC) 330 capable of performing various fault detection analyses relating to the processing of semiconductor wafers 105. The fault detection and classification unit 330 is capable of providing data relating to faults during processing of a semiconductor wafer 105. Fault detection analysis performed by the fault detection and classification unit 330 may include analysis of tool-state data and/or metrology data. The FDC unit 330 may correlate particular tool-state data to errors detected on the processed semiconductor wafer 105 by analyzing the metrology tool data. For example, particular errors, such as critical dimension errors discovered on the processed semiconductor wafers 105 may be correlated to particular gas flow rates or temperature data relating to tool-state data. The fault detection performed by the FDC unit 330 may also include analyzing data from in situ sensors integrated into the processing tools 710.

The system 300 may also comprise a primary controller 350 and a secondary controller 360 that may be used together to provide a coarse-point and a fine-point control adjustment scheme. The primary controller 350 is capable of performing broad-based process control of primary control parameters/variables that affect the overall operation of processing semiconductor wafers 105. For example, the primary controller 350 may adjust a recipe parameter that may be used to change the approach of processing a particular semiconductor wafer 105. In one embodiment, the primary controller 350 reacts to a relatively high threshold, as compared to the secondary controller 360, when performing feedback and/or feed-forward corrections. In other words, the primary controller 350 performs a run-to-run coarse-point adjustment whereas the secondary controller 360 may perform a secondary run-to-run correction and/or a wafer-to-wafer control adjustment.

The secondary controller 360 may be used in a nested fashion in relation to the primary controller 350 to implement a nested feedback control scheme to provide a multivariate feedback/feed-forward control adjustment scheme. For example, while the primary controller 350 may adjust a recipe at predetermined intervals, the secondary controller 360 may adjust a plurality of secondary parameters, such as a down-force parameter relating to an arm that positions a semiconductor wafer 105 relative to a grinder during a polishing process. Furthermore, the secondary controller 360 may perform more fine-point detection of faults that may not be detected by the primary controller 350. For example, a drift in a tool state, such as pressure, may not be calculated as a fault by the FDC unit 330; therefore, the primary controller 350 may not react to such a drift. However, utilizing the secondary controller 360, the drift may be detected and a change in the pressure may be adjusted. For example, the pressure in a chamber associated with the processing tool 710 may build up as a foreline associated with the processing tool 710 becomes clogged. Before the primary controller 350 reacts to such a drift, the secondary controller 360 may adjust a throttle pressure valve, for example, to control the pressure from drifting away from a predetermined normal value. The secondary controller 360 may also adjust a gas flow, a temperature associated with a process, and the like. The secondary controller 360 performs feedback corrections in a nested fashion to supplement the corrections performed by the primary controller 350. A more detailed description of the secondary controller 360 is provided in FIG. 5 and accompanying description below.

The process controller 310, the FDC unit 330, the primary controller 350, and/or the secondary controller 360 may be software, hardware, or firmware units that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
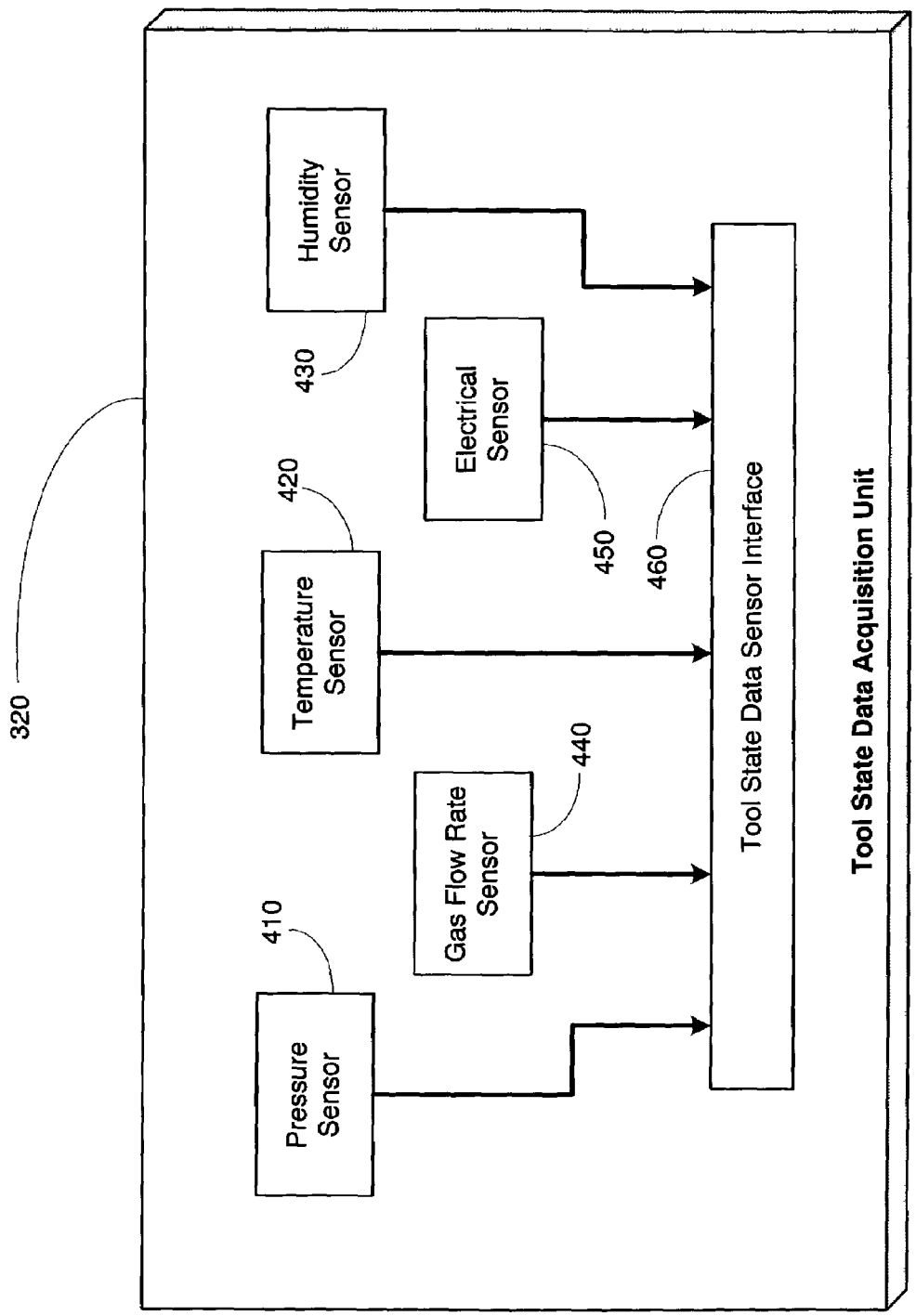
FIG. 4 illustrates a more detailed block diagram representation of a tool-state data acquisition unit of FIG. 3, in accordance with one illustrative embodiment of the present invention.

Turning now to FIG. 4, a more detailed block diagram depiction of the tool-state data acquisition unit 320 illustrated in FIG. 3 is provided. The tool-state data acquisition unit 320 may comprise any of a variety of different types of sensors, e.g., a pressure sensor 410, a temperature sensor 420, a humidity sensor 430, a gas flow rate sensor 440, an electrical sensor 450, etc. In an alternative embodiment, the tool-state data acquisition unit 320 may comprise in situ sensors that are integrated into the processing tool 710. The pressure sensor 410 is capable of detecting the pressure within the processing tool 710. The temperature sensor 420 is capable of sensing the temperature of various portions of the processing tool 710. The humidity sensor 430 is capable of detecting the relative humidity at various portions in the processing tool 710, or of the surrounding ambient conditions. The gas flow rate sensor 440 may comprise a plurality of flow-rate sensors that are capable of detecting the flow-rate of a plurality of process gases utilized during processing of semiconductor wafers 105. For example, the gas flow rate sensor 440 may comprise sensors that can detect the flow rate of gases such as $NH_3$, $SiH_4$, $N_2$, $N_2O$, and/or other process gases.

In one embodiment, the electrical sensor 450 is capable of detecting a plurality of electrical parameters, such as the current, voltage, or power provided to a lamp used in a photolithography process. The tool-state data acquisition unit 320 may also comprise other sensors capable of detecting a variety of manufacturing variables known to those skilled in the art having benefit of the present disclosure. The tool-state data acquisition unit 320 may also comprise a tool-state data sensor data interface 460. The tool-state data sensor interface 460 may receive data from the various sensors that are contained within, or associated with, the processing tool 710 and/or the tool-state data acquisition unit 320 and transmit the data to the process controller 310.

Figure 5:
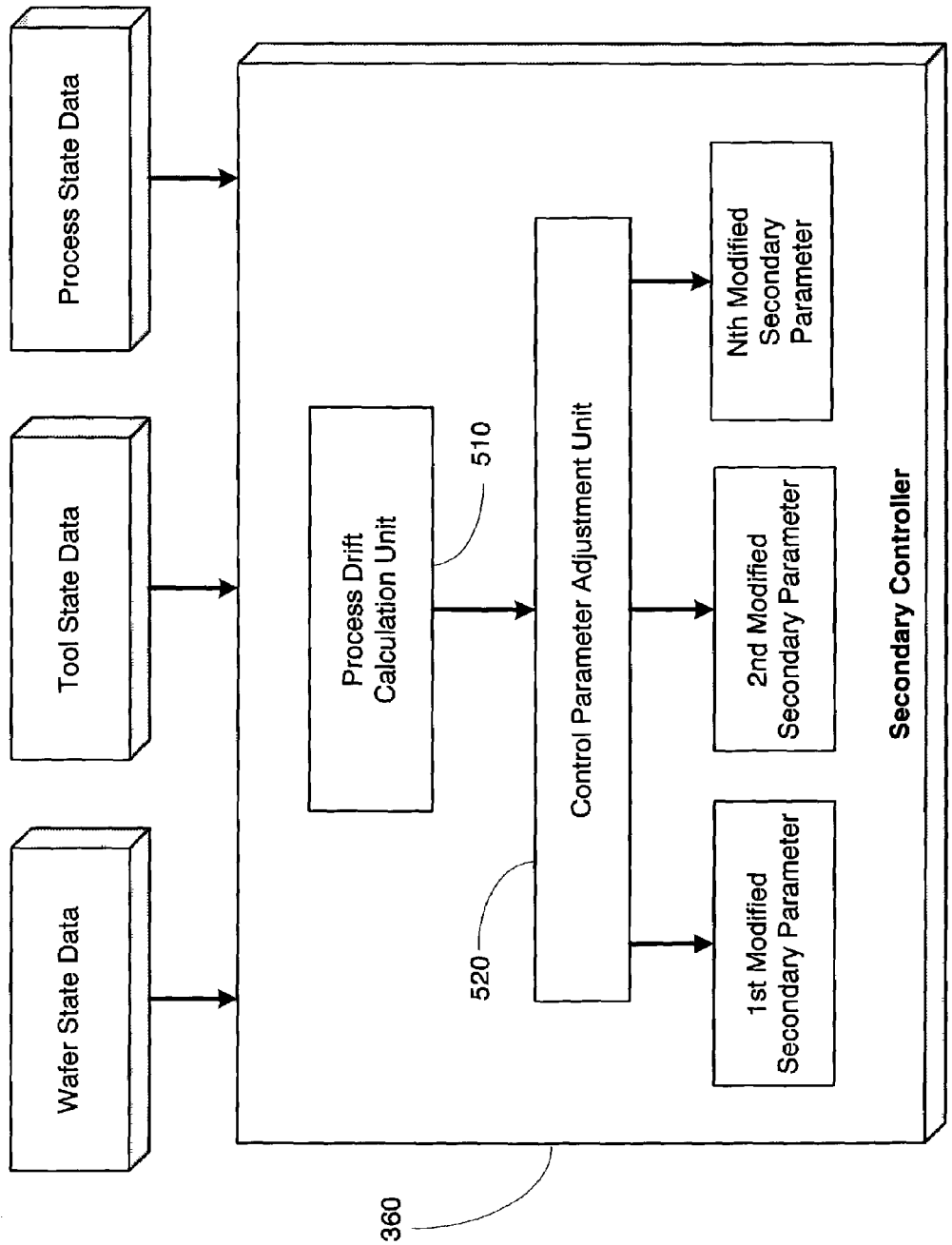
FIG. 5 illustrates a more detailed block diagram representation of a secondary controller of FIG. 3, in accordance with one illustrative embodiment of the present invention.

Turning now to FIG. 5, a more detailed block diagram of the secondary controller 360 in accordance with embodiments of the present invention is illustrated. The secondary controller 360 may receive a plurality of types of manufacturing data, such as wafer state data, tool-state data, and/or process state data. The wafer state data may relate to certain types of data associated with the processed semiconductor wafers 105, which may be provided by analyzing the metrology data. For example, the wafer state data may include the thickness of a deposited film, critical dimension measurements, and the like. The process state data may include data related to the state of the process that may be provided by certain tools, such as a residual gas analyzer tool that provides data relating to the residual gas associated with the processing tools 710, which may provide the state of the process itself. Other examples of process-state data may include optical emission spectroscopy (OES) data, vacuum particle sensor, liquid chemical concentration data, Fourier transform infrared (FTIR), and the like.

The secondary controller 360 may comprise a process drift calculation unit 510 and a control parameter adjustment unit 520. The process drift calculation unit 510 may perform an analysis to calculate the amount of drift in the operation of the processing tools 710. For example, the process drift calculation unit 510 may provide an indication regarding the drift of the pressure in a chamber associated with the processing tools 710. Utilizing the wafer state data, the tool-state data, and/or the process state data, the control parameter adjustment unit 520 may calculate adjustments to one or more parameters that may be adjusted in a secondary feedback process manner. The control parameter adjustment unit 520 may provide a first through Nth modified secondary parameters that may be implemented as secondary feedback or feed-forward process adjustments. Various tool state parameters, such as pressure flow, temperature and RF power, may be adjusted using the secondary controller 360, wherein adjustment of primary control factors, such as the recipe used to control a process step, may be performed on a less frequent, coarse-type process adjustment. A more detailed description of the nested process control scheme provided by the primary controller 350 and the secondary controller 360 is provided in FIG. 6 and accompanying description below.

Figure 6:
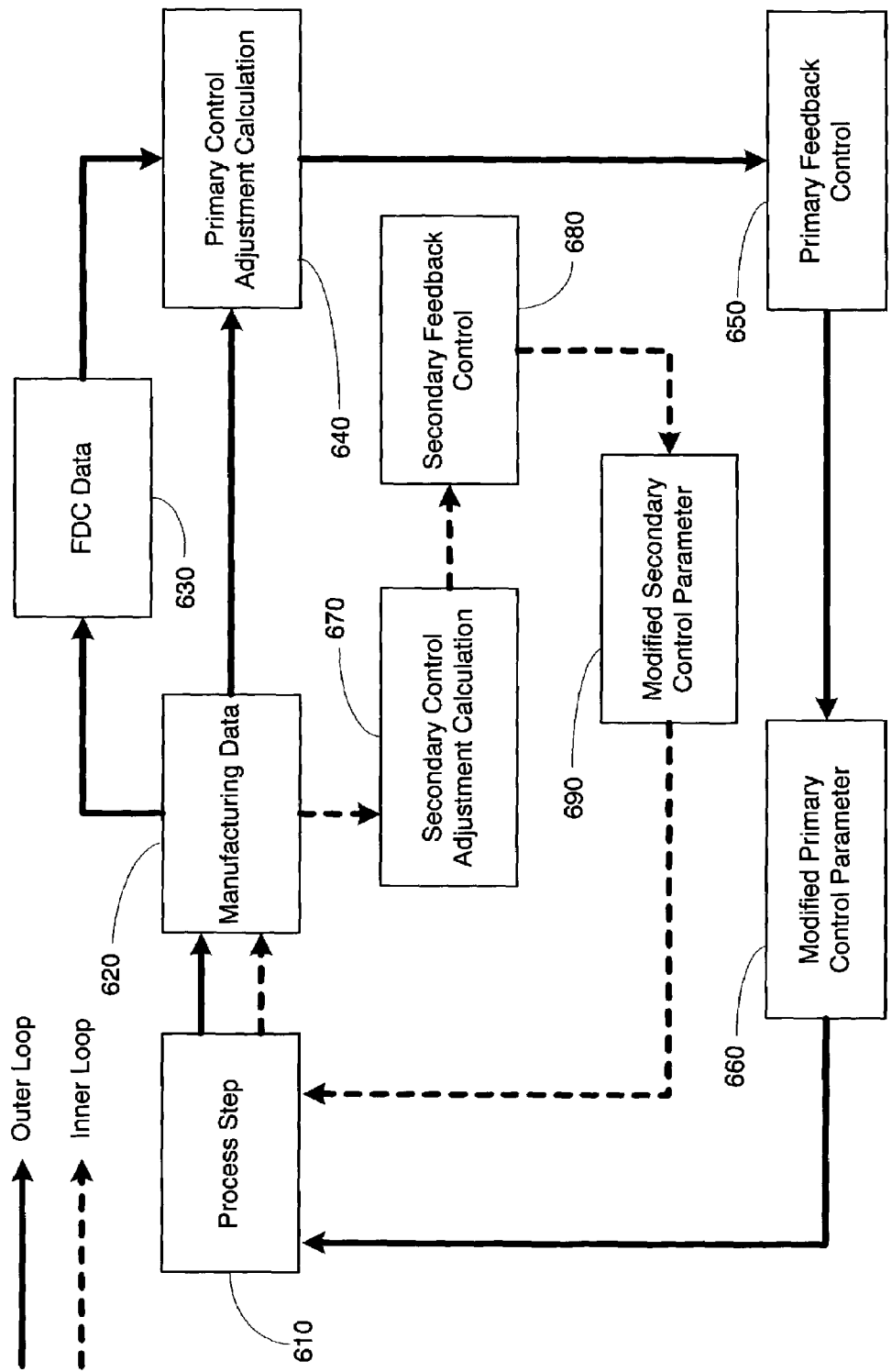
FIG. 6 illustrates a multi-variate process control system that employs a primary feedback control system with a nested secondary feedback control system.

Turning now to FIG. 6, a block diagram of a process control configuration in a nested fashion, in accordance with embodiments of the present invention, is illustrated. Upon performing a process step (block 610), various types of manufacturing data may be acquired by the system 300 (block 620). Data that is acquired may include wafer state data, tool-state data, and/or process state data. The manufacturing data may be used to generate FDC data (block 630). The manufacturing data and/or the FDC data may be used to perform a primary control adjustment calculation (block 640) that may be used to modify a primary control parameter relating to a process step. Utilizing the adjustment calculations, a primary feedback control (block 650) may be performed to provide a modified primary control parameter (block 660) that is sent back to the process step (block 610). This feedback control takes the form of an outer loop (the path from blocks 610-620-630-640-650-660) that is generally performed in a uni-variate manner, e.g., modifying a recipe parameter relating to the process step.

Within the outer loop defined by blocks 610-660, a nested loop, indicated by the path from block 610 to 620 to 670 to 680 to 690, may be implemented. The manufacturing data may be used to perform a secondary process adjustment calculation (block 670) to determine modifications that may be made to secondary control parameters. For example, if the primary controller 350 is an etch time controller, the secondary controller 360 may be a controller that controls the pressure, the RF power, gas flow rates, and/or the like. As another example, if the primary controller 350 is a polish time controller, the secondary controller 360 may be a controller that controls an arm (which may hold a polishing apparatus) pressure, a belt speed, and/or a polish slurry concentration. As another example, if the primary controller 350 is a deposition time controller, the secondary controller 360 may be a controller that controls a gap distance, an electrode distance, and/or the like. Yet another example, if the primary controller 350 is a photoresist dispense time controller, the secondary controller 360 may be a controller that controls a spin speed, wafer temperature, liquid viscosity, and/or the like.

The secondary process adjustment calculation(s) may provide data that may be used to perform a secondary feedback control (block 680). The secondary feedback control process may provide a plurality of secondary control parameters (block 690) that may be modified and fed back to the process step. The operation of the nested inner loop defined by blocks 610, 620, 670, 680 and 690 may be performed at a different frequency or rate as that of the feedback control performed by the outer loop illustrated in FIG. 6. Therefore, asynchronous feedback corrections may be made to a process in a multi-variate fashion to perform a coarse-point and a fine-point adjustment to a process step. The inner loop performs a secondary feedback control to adjust one or more tool state parameters, etc. The secondary process defined by the inner loop may use data provided by a variety of tools such as an optical spectroscopy metrology tool, a chemical composition sensor, a residual gas analyzer and the like to provide a variety of secondary parameters that may be adjusted to perform a fine-tuned control adjustment of a process performed on semiconductor wafers 105.

Figure 7:
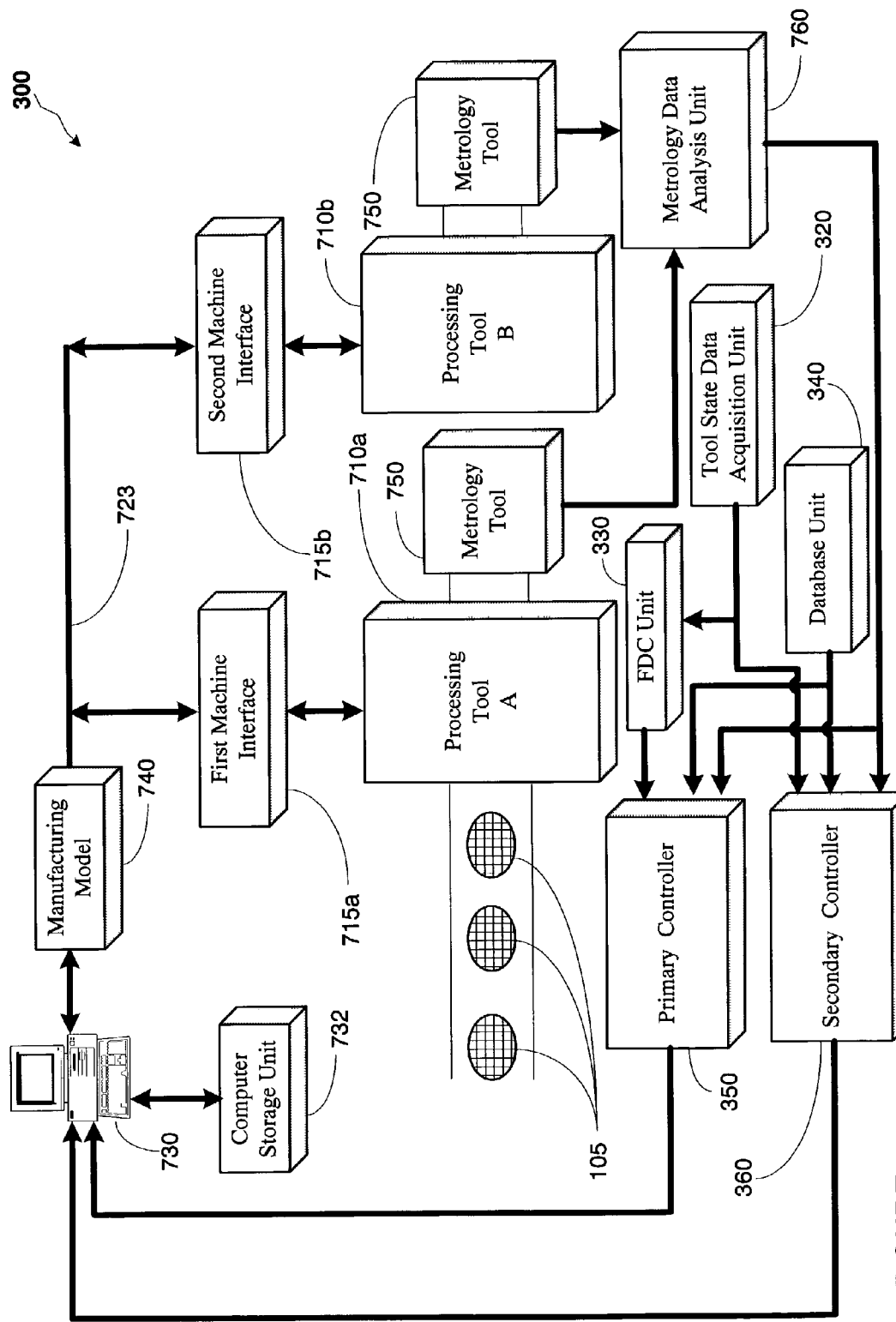
FIG. 7 illustrates a more detailed block diagram representation of the system shown in FIG. 3, in accordance with one illustrative embodiment of the present invention.

Turning now to FIG. 7, a more detailed block diagram of the system 300 in accordance with one embodiment of the present invention is illustrated. Semiconductor wafers 105 are processed on processing tools 710a, 710b using a plurality of control input signals, or manufacturing parameters, provided via a line or network 723. The control input signals, or manufacturing parameters, on the line 723 are sent to the processing tools 710a, 710b from a computer system 730 via machine interfaces 715a, 715b. The first and second machine interfaces 715a, 715b are generally located external the processing tools 710a, 710b. In an alternative embodiment, the first and second machine interfaces 715a, 715b are located within the processing tools 710a, 710b. The semiconductor wafers 105 are provided to and carried from a plurality of processing tools 710. In one embodiment, semiconductor wafers 105 may be provided to a processing tool 710 manually. In an alternative embodiment, semiconductor wafers 105 may be provided to a processing tool 710 in an automatic fashion (e.g., robotic movement of semiconductor wafers 105). In one embodiment, a plurality of semiconductor wafers 105 is transported in lots (e.g., stacked in cassettes) to the processing tools 710.

In one embodiment, the computer system 730 sends control input signals, or manufacturing parameters, on the line 723 to the first and second machine interfaces 715a, 715b. The computer system 730 is capable of controlling processing operations. In one embodiment, the computer system 730 is a process controller. The computer system 730 is coupled to a computer storage unit 732 that may contain a plurality of software programs and data sets. The computer system 730 may contain one or more processors (not shown) that are capable of performing the operations described herein. The computer system 730 employs a manufacturing model 740 to generate control input signals on the line 723. In one embodiment, the manufacturing model 740 contains a manufacturing recipe that determines a plurality of control input parameters that are sent on the line 723 to the processing tools 710a, 710b.

In one embodiment, the manufacturing model 740 defines a process script and input control that implement a particular manufacturing process. The control input signals (or control input parameters) on the line 723 that are intended for processing tool A 710a are received and processed by the first machine interface 715a. The control input signals on the line 723 that are intended for processing tool B 710b are received and processed by the second machine interface 715b. Examples of the processing tools 710a, 710b used in semiconductor manufacturing processes are steppers, etch process tools, deposition tools, and the like.

One or more of the semiconductor wafers 105 that are processed by the processing tools 710a, 710b can also be sent to a metrology tool 750 for acquisition of metrology data. The metrology tool 750 may be a scatterometry data acquisition tool, an overlay-error measurement tool, a critical dimension measurement tool, and the like. In one embodiment, a metrology tool 750 examines one or more processed semiconductor wafers 105. The metrology data analysis unit 760 may collect, organize, and analyze data from the metrology tool 750. The metrology data is directed to a variety of physical or electrical characteristics of the devices formed across the semiconductor wafers 105. For example, metrology data may be obtained as to line width measurements, depth of trenches, sidewall angles, thickness, resistance, optical properties of deposited film, film thickness, overlay accuracy, and the like. Metrology data may be used to determine faults that may be present across the processed semiconductor wafers 105, which may be used to quantify the performance of the processing tools 710.

As provided above, the primary controller 350 may receive metrology data from the metrology data analysis unit 760, the database unit 340, which may store a variety of manufacturing data, and/or the FDC unit 330. The fault data and/or the manufacturing data may be used by the primary controller 350 to perform a coarse-point adjustment, such as modifying a recipe relating to a process. Data from the primary controller 350 may be sent to the computer system 730 for implementation of a process control, for example, as illustrated by the outer loop illustrated in FIG. 6. The secondary controller 360 may receive data from the metrology data analysis unit 760, the database unit 340 and/or the tool-state data acquisition unit 320 and perform a secondary control adjustment upon a plurality of secondary control parameters. Data from the secondary controller 360 may be sent to the computer system 730, which may implement secondary control parameter adjustments in a nested fashion, which is illustrated by the inner loop shown in FIG. 6. The computer system 730 may implement the outer loop process control scheme provided by the primary controller 350 at a different rate as the secondary control provided by the secondary controller 360.

Figure 8:
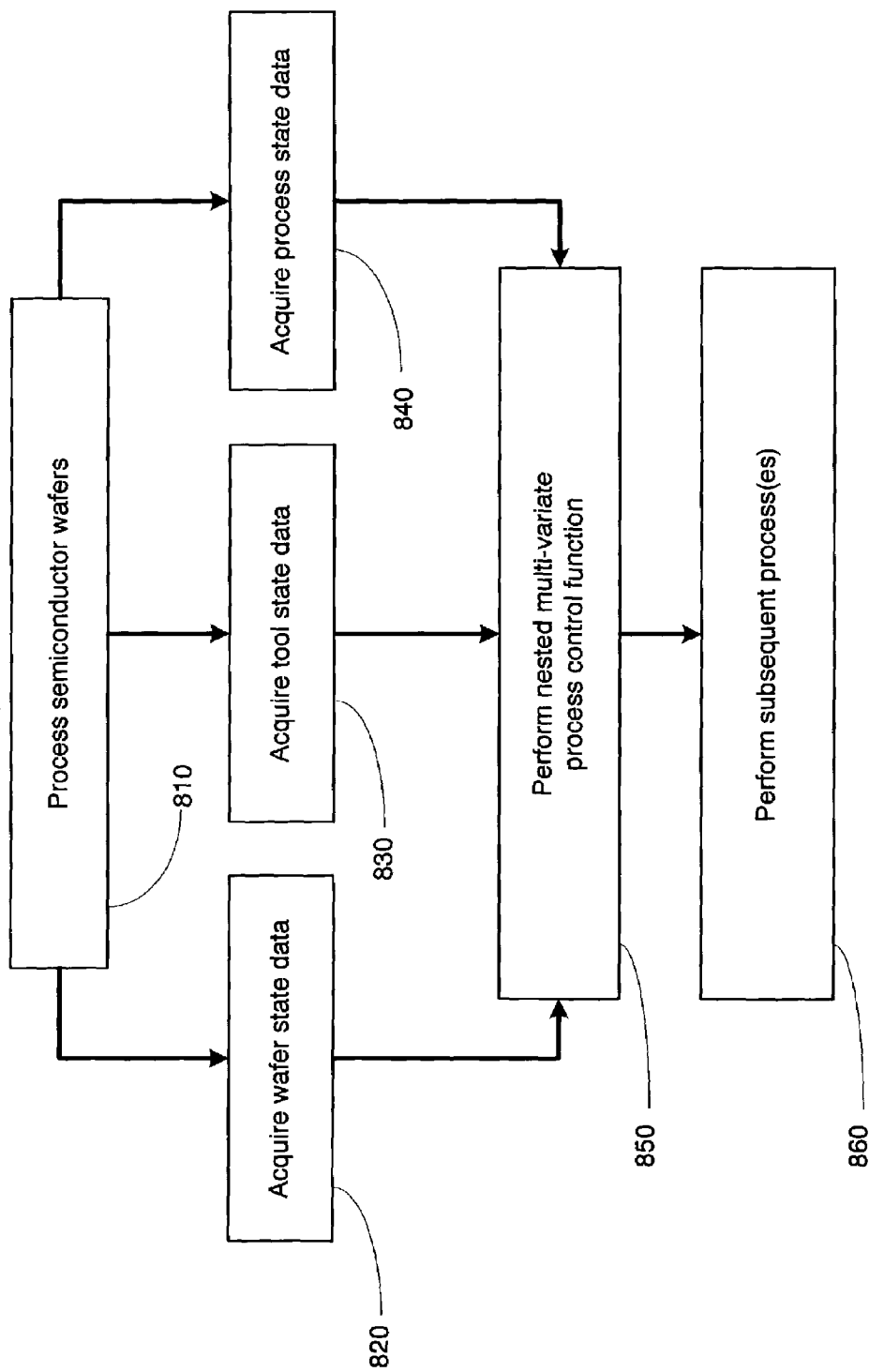
FIG. 8 illustrates a flowchart depiction of a method in accordance with one illustrative embodiment of the present invention.

Turning now to FIG. 8, a flow chart depiction of the method in accordance with embodiments of the present invention is provided. The system 300 may process semiconductor wafers 105 (block 810). Upon processing the semiconductor wafers 105, the system 300 may acquire wafer state data, which may result from analysis of metrology data acquired by the system 300 (block 820). The system 300 may also acquire tool-state data associated with the processing of semiconductor wafers 105 (block 830). Furthermore, the system 300 may also acquire process state data relating to the process performed by the system 300 (block 840).

The wafer state data, the tool-state data and/or the process state data may be used by the system 300 to perform a nested multi-variate process control function (block 850). The nested multi-variate process control function includes performing a coarse-point adjustment that modifies primary control parameters that control the operation of the processing of semiconductor wafers 105. This may be supplemented by implementing a nested control function that is nested within the coarse-point primary control function to perform a secondary control. The secondary control may modify one or more secondary control parameters to perform a fine-point control adjustment to the process performed on the semiconductor wafers 105. The nested multi-variate process control function provides for an outer process control loop that may operate at a different rate as that of the nested, inner secondary process control loop. Therefore, the multi-variate nested control function provides for coarse-point and fine-point adjustments to processes performed on the semiconductor wafers 105. Upon implementing the nested multi-variate process control function, the system 300 performs subsequent processes based upon coarse and fine tuned adjustments (block 860).

Utilizing embodiments of the present invention, coarse-point and fine-point adjustments to processes performed on semiconductor wafers 105 are implemented such that more efficiently and accurately processed semiconductor wafers 105 may be produced. Utilizing embodiments of the present invention, a multi-variate feedback scheme may be implemented. The secondary control scheme taught by the present invention may be implemented in a manner that is independent with the primary control scheme, thereby allowing for portability of the secondary control scheme. Therefore, the secondary control scheme may be turned on or off during the operation of the primary control scheme. Additionally, the secondary control scheme may be exported to other process settings in a manufacturing facility. The teachings provided by embodiments of the present invention may be utilized in a variety of manufacturing areas.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
 processing a workpiece using a primary process control function during a first time period; and
 performing a secondary process control function relating to said processing said workpiece during at least a portion of said first time period, wherein said secondary process control function is capable of modifying at least one secondary control parameter and wherein at least a portion of said secondary process control function is nested within said primary process control function.

2. The method of claim 1, wherein processing said workpiece further comprises processing a semiconductor wafer.

3. The method of claim 1, wherein processing said workpiece using said primary process control function further comprises processing said workpiece using said primary process control function using a primary process controller.

4. The method of claim 3, wherein performing said secondary process control function further comprises performing said secondary process control function using a secondary process controller.

5. The method of claim 4, wherein performing said primary and secondary process control functions further comprises performing said primary and secondary process control functions using a secondary control loop being nested within a primary control loop.

6. The method of claim 1, further comprising acquiring manufacturing data for performing said primary and secondary process control functions.

7. The method of claim 6, wherein acquiring manufacturing data further comprises acquiring at least one of a wafer state data, a tool-state data, and a process state data.

8. The method of claim 7, wherein acquiring wafer state data further comprises acquiring metrology data.

9. The method of claim 7, wherein acquiring tool-state data further comprises acquiring tool-state data relating to at least one of a pressure data, a temperature data, a humidity data, and a gas flow rate data relating to a process step performed upon said workpiece.

10. The method of claim 1, wherein performing said secondary process control function further comprises performing a multi-variate process control function.

11. The method of claim 1, wherein processing said workpiece using a primary process control function further comprises modifying a primary control parameter.

12. The method of claim 11, wherein modifying said primary control parameter further comprises modifying a control parameter that controls at least one of a process recipe, a polish time, a photoresist dispense time, a deposition time, and an etch time.

13. The method of claim 1, wherein modifying at least one secondary control parameter further comprises modifying a control parameter that control at least one of a pressure, a temperature, a humidity, and a gas flow rate, an arm pressure, a belt speed, a polish slurry concentration, and a spin speed.

14. An apparatus, comprising:
 means for processing a workpiece using a primary process control function during a first time period; and
 means for performing a secondary process control function relating to said processing said workpiece during at least a portion of said first time period for processing of said workpiece, wherein said secondary process control function is capable of modifying at least one secondary control parameter and wherein at least a portion of said secondary process control function is nested within said primary process control function.

15. A system, comprising:
 a processing tool to process a workpiece;
 a primary process controller operatively coupled to said processing tool, said primary process controller to process said workpiece using a primary process control function during a first time period; and
 a secondary process controller operatively coupled to said processing tool and to said primary process controller, said secondary process controller for performing a secondary process control function during at least a portion of said first time period for processing of said workpiece, wherein said secondary process control function is capable of modifying at least one secondary control parameter and wherein at least a portion of a function relating to said secondary process controller is nested within at least one portion of a function relating to said primary process controller.

16. The system of claim 15, wherein said second processing controller forms a secondary process loop that is nested with a primary loop formed by said primary process controller.

17. The system of claim 15, wherein said workpiece is a semiconductor wafer.

18. The system of claim 15, further comprising:
 a tool-state data acquisition unit operatively coupled to said primary and secondary process controllers and to said processing tool, said tool-state data acquisition unit to acquire tool-state data relating to operations performed by said processing tool;
 a metrology tool operatively coupled to said primary and secondary process controllers and to said processing tool, said metrology tool to acquire metrology data relating to said workpiece; and
 a database unit to store said at least one of metrology data and said tool-state data.

19. The system of claim 18, wherein said tool-state data acquisition unit comprises at least one of a pressure sensor, gas flow sensor, temperature sensor, humidity sensor, and an electrical sensor.

20. An apparatus, comprising:
 a primary process controller operatively coupled to a processing tool, said primary process controller to process a workpiece using a primary process control function during a first time period; and
 a secondary process controller operatively coupled to said processing tool and to said primary process controller, said secondary process controller for performing a secondary process control function during at least a portion of said first time period for processing of said workpiece, wherein said secondary process control function is capable of modifying at least one secondary control parameter and wherein at least a portion of a function relating to said secondary process controller is nested within at least one portion of a function relating to said primary process controller.

21. The apparatus of claim 20, wherein said workpiece is a semiconductor wafer.

22. The apparatus of claim 20, further comprising:
a tool-state data acquisition unit operatively coupled to said primary and secondary process controllers and to said processing tool, said tool-state data acquisition unit to acquire tool-state data relating to operations performed by said processing tool;
a metrology tool operatively coupled to said primary and secondary process controllers and to said processing tool, said metrology tool to acquire metrology data relating to said workpiece; and
a database unit to store said at least one of metrology data and said tool-state data.

23. The apparatus of claim 22, wherein said tool-state data acquisition unit comprises at least one of a pressure sensor, gas flow sensor, temperature sensor, humidity sensor, and an electrical sensor.

24. A computer readable program storage device encoded with instructions that, when executed by a computer, performs a method, comprising:
processing a workpiece using a primary process control function during a first time period; and
performing a secondary process control function relating to said processing said workpiece during at least a portion of said first time period for processing of said workpiece, wherein said secondary process control function is capable of modifying at least one secondary control parameter and wherein at least a portion of said secondary process control function is nested within said primary process control function.

25. The computer readable program storage device encoded with instructions that, when executed by a computer, performs the method of claim 24, wherein processing said workpiece further comprises processing a semiconductor wafer.

26. The computer readable program storage device encoded with instructions that, when executed by a computer, performs the method of claim 24, wherein processing said workpiece using said primary process control function further comprises processing said workpiece using said primary process control function using a primary process controller.

27. The computer readable program storage device encoded with instructions that, when executed by a computer, performs the method of claim 26, wherein performing said secondary process control function further comprises performing said secondary process control function using a secondary process controller.

28. The computer readable program storage device encoded with instructions that, when executed by a computer, performs the method of claim 27, wherein performing said primary and secondary process control functions further comprises performing said primary and secondary process control functions using a secondary control loop being nested within a primary control loop.

29. The computer readable program storage device encoded with instructions that, when executed by a computer, performs the method of claim 24, further comprising acquiring manufacturing data for performing said primary and secondary process control function.

30. The computer readable program storage device encoded with instructions that, when executed by a computer, performs the method of claim 29, wherein acquiring manufacturing data further comprises acquiring at least one of a wafer state data, a tool-state data, and a process state data.

31. The computer readable program storage device encoded with instructions that, when executed by a computer, performs the method of claim 29, wherein acquiring wafer state data further comprises acquiring metrology data.

32. The computer readable program storage device encoded with instructions that, when executed by a computer, performs the method of claim 29, wherein acquiring tool-state data further comprises acquiring tool-state data relating to at least one of a pressure data, a temperature data, a humidity data, and a gas flow rate data relating to a process step performed upon said workpiece.

33. The computer readable program storage device encoded with instructions that, when executed by a computer, performs the method of claim 24, wherein performing said secondary process control function further comprise performing a multi-variate process control function.

34. The computer readable program storage device encoded with instructions that, when executed by a computer, performs the method of claim 24, wherein processing said workpiece using a primary process control function further comprises modifying a primary control parameter.

35. The computer readable program storage device encoded with instructions that, when executed by a computer, performs the method of claim 34, wherein modifying said primary control parameter further comprises modifying a control parameter that controls at least one of a process recipe, a polish time, a photoresist dispense time, a deposition time, and an etch time.

36. The computer readable program storage device encoded with instructions that, when executed by a computer, performs the method of claim 24, wherein modifying at least one secondary control parameter further comprises modifying a control parameter that control at least one of a pressure, a temperature, a humidity, and a gas flow rate, an arm pressure, a belt speed, a polish slurry concentration, and a spin speed.

* * * * *